(12) United States Patent
Wang et al.

(10) Patent No.: US 8,368,656 B2
(45) Date of Patent: Feb. 5, 2013

(54) ELECTROLUMINESCENT DISPLAY TOUCH PANEL

(75) Inventors: Chao-Chen Wang, Hsin-Chu (TW);
Yao-Jen Hsieh, Hsin-Chu (TW);
Heng-Sheng Chou, Hsin-Chu (TW);
Pang-Chiang Chia, Hsin-Chu (TW);
Yu-Cheng Tsai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 640 days.

(21) Appl. No.: 12/324,838

(22) Filed: Nov. 27, 2008

(65) Prior Publication Data
US 2010/0001965 A1 Jan. 7, 2010

(30) Foreign Application Priority Data
Jul. 4, 2008 (TW) ................................ 97125227 A

(51) Int. Cl.
*G06F 3/041* (2006.01)
(52) U.S. Cl. ......................................................... 345/173
(58) Field of Classification Search .................... 345/173
See application file for complete search history.

(56) References Cited

U.S. PATENT DOCUMENTS

| | | | |
|---|---|---|---|
| 6,501,529 B1 | 12/2002 | Kurihara | |
| 6,876,355 B1* | 4/2005 | Ahn et al. | 345/173 |
| 7,199,322 B2 | 4/2007 | Bourdelais et al. | |
| 2003/0179323 A1* | 9/2003 | Abileah et al. | 349/24 |
| 2004/0212599 A1 | 10/2004 | Cok | |
| 2006/0017710 A1 | 1/2006 | Lee | |
| 2006/0033016 A1 | 2/2006 | Ogawa | |
| 2006/0132461 A1* | 6/2006 | Furukawa et al. | 345/173 |
| 2006/0187213 A1 | 8/2006 | Su | |
| 2007/0262967 A1 | 11/2007 | Rho | |
| 2008/0117182 A1* | 5/2008 | Um et al. | 345/173 |
| 2008/0129898 A1* | 6/2008 | Moon | 349/12 |
| 2008/0151133 A1 | 6/2008 | Kim | |
| 2008/0160864 A1* | 7/2008 | Song et al. | 445/3 |
| 2008/0165139 A1* | 7/2008 | Hotelling et al. | 345/173 |

FOREIGN PATENT DOCUMENTS

| | | |
|---|---|---|
| JP | 2003077679 | 3/2003 |
| JP | 200752368 | 3/2007 |
| KR | 1020060009602 | 2/2006 |
| TW | 200511131 | 3/2005 |
| TW | 200606694 | 2/2006 |

* cited by examiner

*Primary Examiner* — Chanh Nguyen
*Assistant Examiner* — Long D Pham
(74) *Attorney, Agent, or Firm* — Winston Hsu; Scott Margo

(57) ABSTRACT

An electroluminescent display touch panel includes a base substrate and an encapsulating substrate. The base substrate includes a pixel switching device, a readout device, an electroluminescent device, and a sensing pad. The pixel switching device and the electroluminescent device are disposed in a display region. The readout device and the sensing pad are disposed in a non-display region. The encapsulating substrate includes a first spacer, a sensing spacer, and a conductive layer. The first spacer is disposed on the surface of the encapsulating substrate facing the base substrate, maintaining a cell gap between the base substrate and the encapsulating substrate. The sensing spacer is disposed on the surface of the encapsulating substrate facing the base substrate and corresponding to the sensing pad. The conductive layer is formed on the surface of the sensing spacer facing the sensing pad.

17 Claims, 4 Drawing Sheets

ELECTROLUMINESCENT DISPLAY TOUCH PANEL

BACKGROUND OF THE INVENTION

1. Field of the Invention

The present invention relates to an electroluminescent display touch panel, and more particularly, to an electroluminescent display, which includes touch input devices integrated on a display panel thereof and supports multiple-touch input function.

2. Description of the Prior Art

An electroluminescent display panel such as an organic light-emitting diode display panel, which has the advantages of self-illumination, high color saturation and low power consumption, has gradually been applied on various kinds of electronic products such as mobile phones, PDAs, and global positioning systems (GPS). In addition, due to the market demand for compact size electronic products, many electronic products having large input device such as keyboard are no longer be designed. Presently, there are some input mechanisms for replacing keyboards, wherein the combination of touch input function and display function is the most popular input technique.

FIG. 1 is a schematic diagram of a conventional electroluminescent display touch panel. As illustrated in FIG. 1, the conventional electroluminescent display touch panel 10 mainly includes an electroluminescent display panel 20 and a touch panel 30. The electroluminescent display panel 20 includes a base substrate 22, an encapsulating substrate 24 and an illumination device 26 disposed between the base substrate 22 and the encapsulating substrate 24. The touch panel 30, attached on an outer surface of the encapsulating substrate 24, includes a first conductive layer 32, a protection cover 34, a second conductive layer 36 and a spacer 38. The first conductive layer 32 is disposed on the outer surface of the encapsulating substrate 24 of the electroluminescent display panel 20, and the second conductive layer 36 is disposed on an inner surface of the protection cover 34, wherein the protection cover 34 is elastic, and maintained a constant gap with the encapsulating substrate 24 of the electroluminescent display panel 20 by the spacer 38 disposed there on normal condition.

As external forces (such as the pressing of fingers) touch and press the protection cover 34, deformation will occur to the protection cover 34, thereby changing the gap between the first conductive layer 32 and the second conductive layer 36. Accordingly, the input signals corresponding to this location may be detected and computed to implement touch input function. However, the conventional electroluminescent display panel and touch panel are fabricated individually, and thus the volume of the electroluminescent display touch panel obviously increases after assembled. Moreover, in general, the conventional electroluminescent display touch panel only supports single-touch input function, but cannot support multiple-touch input function. Consequently, the application is limited. For instance, dragging control function is not supported.

SUMMARY OF THE INVENTION

One object of the present invention is to provide an electroluminescent display touch panel to decrease the thickness of electroluminescent display touch panel and render it a function of multiple-touch input.

To achieve the above-mentioned purpose, the present invention provides an electroluminescent display touch panel including a base substrate and an encapsulating substrate. The base substrate has a display region and a non-display region (including a sensing region) defined thereon. The base substrate includes a pixel switching device, a readout device, an electroluminescent device, and a sensing pad. The pixel switching device and the electroluminescent device are disposed in the display region of the base substrate, while the readout device and the sensing pad are disposed in the non-display region of the base substrate. The electroluminescent device includes a first electrode, a second electrode and an illumination element disposed between the first electrode and the second electrode, and the first electrode is electrically connected with the pixel switching device. The sensing pad is electrically connected with the readout device. The encapsulating substrate, disposed opposite to the base substrate, includes a first spacer, a sensing spacer and a conductive layer, wherein the first spacer is disposed on one side of the encapsulating substrate facing the base substrate and maintains a constant distance between the base substrate and the encapsulating substrate. The sensing spacer disposed on a surface of the encapsulating substrate facing the base substrate is corresponding to the sensing pad, and the conductive layer is disposed on a surface of the sensing spacer facing the sensing pad.

The electroluminescent display touch panel of the present invention integrates the touch input devices into the interior of the electroluminescent display panel, and consequently obviously decreases the thickness of the electroluminescent display panel.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be detailed as follows. The preferred embodiments of the present invention are illustrated in the accompanying drawings with numbered elements to elaborate the contents and effects to be achieved.

Figure 1:
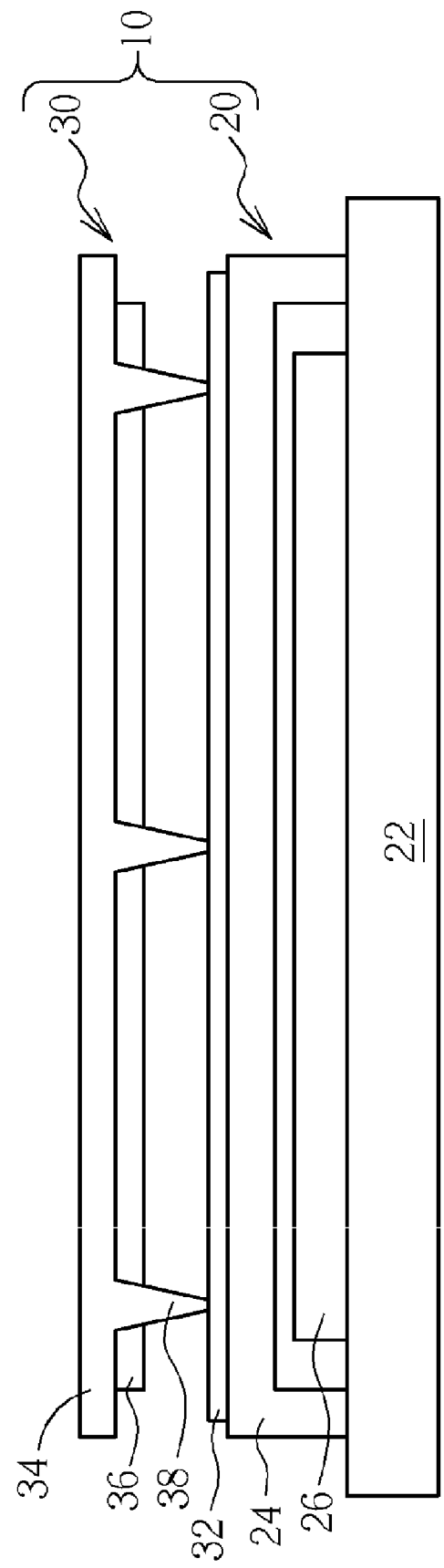
FIG. 1 is a schematic diagram showing a conventional electroluminescent display touch panel.
Figure 2:
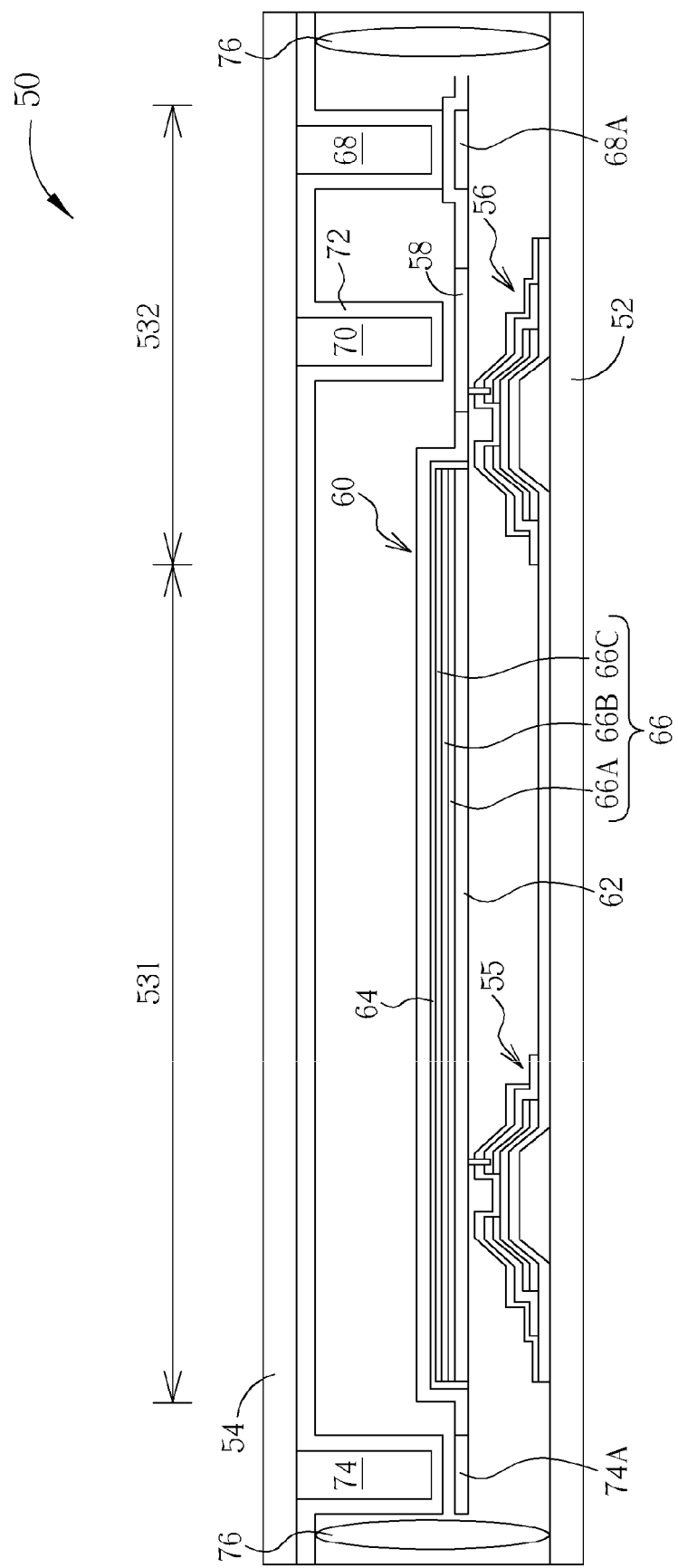
FIG. 2 and FIG. 3 are schematic diagrams showing a preferred embodiment of an electroluminescent display touch panel in the present invention.
Figure 3:
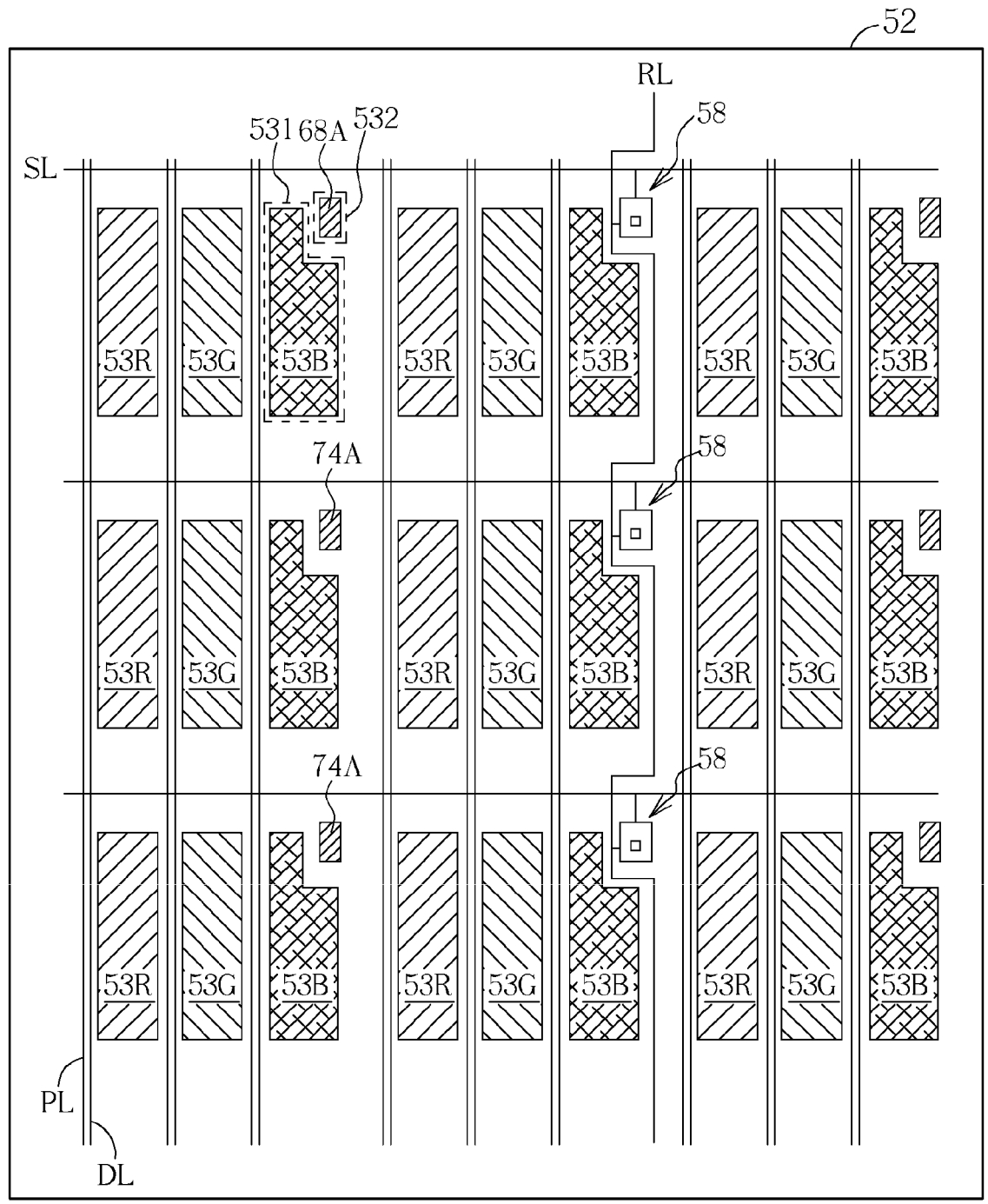

FIG. 2 and FIG. 3 are schematic diagrams of a preferred embodiment of an electroluminescent display touch panel in the present invention, wherein the pixel arrangement of the electroluminescent display touch panel in this embodiment is stripe type. FIG. 2 is a top view of the electroluminescent display touch panel, and FIG. 3 is a cross-sectional view of a single pixel structure of the electroluminescent display touch panel. As illustrated in FIG. 2 and FIG. 3, the electroluminescent display touch panel 50 in this present embodiment includes a first substrate such as a base substrate 52 and a second substrate such as an encapsulating substrate 54 disposed oppositely. In order to clearly show the pixel arrangement in this embodiment, only the base substrate 52 is illustrated in FIG. 2. The base substrate 52 includes a plurality of scan lines SL and a plurality of data lines DL. The scan lines SL mutually cross with the data lines DL, which defines a plurality of pixel regions 53 on the base substrate 52. Each pixel region 53 includes a red sub-pixel region 53R, a green sub-pixel region 53G and a blue sub-pixel region 53B, wherein each sub-pixel region includes a display region 531 and a non-display region 532, and the non-display region 532 includes a sensor region used for sensing. Moreover, a pixel switching device 55, a readout device 56, a sensing pad 58, an electroluminescent device 60, a power source line PL and a readout line RL are disposed on the base substrate 52. The pixel switching device 55 and the readout device 56 may be thin film transistors fabricated by the same TFT fabrication process. The pixel switching device 55 and the electroluminescent device 60 are disposed in the display region 531 of the base substrate 52, and the pixel switching device 55 is disposed under the electroluminescent device 60. The readout device 56 and the sensing pad 58 are disposed in the non-display region 532 of the base substrate 52, and the sensing pad 58 is electrically connected to the source electrode of the readout device 56. In addition, the readout line RL is electrically connected to the drain electrode of the readout device 56, and can receive touch input signals generated from the sensing pad 58. The gate line is electrically connected to the gate electrode of the readout device 56 to switch the readout device 56.

In the present embodiment, the electroluminescent device 60 can be an organic light-emitting diode device, but not limited. For example, the electroluminescent device 60 may be various types of electroluminescent devices. The electroluminescent device 60 includes a first electrode 62, a second electrode 64 and an illumination element 66, wherein the first electrode 62 can be served as a cathode and the second electrode 64 can be served as an anode but not limited. The illumination element 66 is disposed between the first electrode 62 and the second electrode 64. The electroluminescent device 60 in the present embodiment is an organic light-emitting device which mainly includes an electron-transporting layer 66A, an organic light-emitting layer 66B and a hole-transporting layer 66C, and other layers e.g. electron-injection layer, hole-injection, etc may be selectively incorporated wherever necessary. The materials of the electron-transporting layer 66A, the organic light-emitting layer 66B and the hole-transporting layer 66C may be any suitable materials at present as well known by a person skilled in the art. In addition, the electroluminescent device 60 may be a white light-emitting device, exhibiting a colorful image by disposing color filters on the encapsulating substrate 54 or the base substrate 52. Alternatively, the illumination element 66 may also be different illumination elements, which emit different colorful lights such as red-light, green-light and blue-light emitting elements, without requiring additional color filters.

The electroluminescent display touch panel 50 in the present embodiment can be a top-emitting type, and the material of the first electrode 62 may be opaque, which can reflect the lights, such as metal materials. And the second electrode 64 uses transparent and conductive materials but not limited. The materials of the first electrode 62 and the second electrode 64 can be adjusted depending on the difference of light emitting directions. In addition, the drain electrode of the pixel switching device 55 is electrically connected with the first electrode 62, and the power source line PL is electrically connected with the second electrode 64, such that voltage signals generated from the power source line PL, and the pixel switching devices 55 can control the gray-scale brightness of the electroluminescent device 60.

The encapsulating substrate 54 of the electroluminescent display touch panel 50 includes a first spacer 68, a sensing spacer 70, and a conductive layer (such as a common electrode) 72. The first spacer 68 is disposed in the non-display region 532 on the encapsulating substrate 54 facing the base substrate 52 and in contact with the base substrate 52, and a first spacer pad 68A is disposed on the base substrate 52 corresponding to the first spacer 68. The first spacer 68 serves as the main spacer and is used to maintain a cell gap at a constant distance between the base substrate 52 and the encapsulating substrate 54. The sensing spacer 70 is disposed on the surface of the encapsulating substrate 54 facing the base substrate 52, and corresponding to the sensing pad 58. The conductive layer 72 made of transparent conductive materials is disposed on the surface of the sensing spacer 70 facing the sensing pad 58 and electrically connects to a common voltage. The conductive layer 72 may also selectively cover the surface of the encapsulating surface 54 facing the base substrate 52, and the sidewall of the sensing spacer 70 as well. In addition, the periphery of the base substrate 52 and the encapsulating substrate 54 are spread and sealed with a sealant 76, such that the base substrate 52 and the encapsulating substrate 54 are bonded.

The touch input device is formed by the conductive layer 72 and the corresponding sensing pad 58. When a user uses the input devices such as a touch input pen or a finger, and gives input on the outer surface of the encapsulating substrate 54, the pressing acting on a certain position of the encapsulating substrate 54 from the touch input device will result in the deformation of the encapsulating substrate 54 at this position. This deformation consequently decreases the gap between the conducting layer 72 disposed on the surface of the sensing spacer 70 and the sensing pad 58 disposed on the base substrate 52, and even makes the conducting layer 72 contact to the sensing pad 58, and therefore generates touch input signals. The generated touch input signals are then received by the readout device 56 which is electrically connected with the sensing pad 58, and subsequently transmitted to related circuits by the readout line RL. By making employ of the scanning time of the scan lines SL and the touch input signals read by the readout line RL, the touch input signals at this position can be detected and computed by coordinate operation according to algorithm in an external circuit. The readout device 56 is disposed on each touch input device in this embodiment, and the input signals concurrently inputted at different positions of the encapsulating substrate 54 may be detected. Thus, the electroluminescent display touch panel 50 of the present invention can support the function of multiple-touch input.

The encapsulating substrate 54 may selectively include a second spacer 74 disposed in the non-display region 532 and on the side of the encapsulating substrate 54 facing the base substrate 52, and the second spacer 74 and the base substrate 52 are not in contact with each other on normal condition. The base substrate 52 further includes a second spacer pad 74A corresponding to the second spacer 74. The second spacer 74 serves as a sub spacer and its function is to prevent excessive distortion of the encapsulating substrate 54 and the damage of other devices while pressed by external forces. In this embodiment, the first spacer 68, the sensing spacer 70, and the second spacer 74 are preferably made of elastic materials and fabricated by the same process. In such condition, the first spacer 68, the sensing spacer 70 and the second spacer 74 may have the same height. The first spacer 68 has to be in contact with the base substrate 52 on normal condition for maintaining a cell gap at a constant distance between the base substrate 52 and the encapsulating substrate 54. In a normal condition, the second spacer 74 does not contact with the base substrate 52, so as to provide a buffering effect. The sensing spacer 70 is contacting with the base substrate 52 on a press condition while the encapsulating substrate 54 is pressed by external forces. In the present embodiment, since the first spacer 68, the sensing spacer 70 and the second spacer 74 are made with the same height, the aforementioned requirements are fulfilled by varying the thickness corresponding to different positions of the base substrate 52. In the present embodiment, the base substrate 52 has a first thickness corresponding to the first spacer pad 68A of the first spacer 68, a second thickness corresponding to the second spacer pad 74A of the first spacer 74, and a third thickness corresponding to the second sensing pad 58 of the sensing spacer 70 has the third thickness, wherein the first thickness is larger than the second thickness and third thickness, and the second thickness may be larger, smaller or substantially equal to the third thickness. Consequently, the first spacer 68 and the base substrate 52 may be in contact with each other, while the second spacer 74 and the sensing spacer 70 are not in contact with the base substrate 52. However, the practice way of the present invention is not limited. In another embodiment, the different requirements for the first spacer 68, the sensing spacer 70 and the second spacer 74 with respect to the base substrate 52 may be fulfilled by varying the height of the first spacer 68, the sensing spacer 70 and the second spacer 74.

Figure 4:
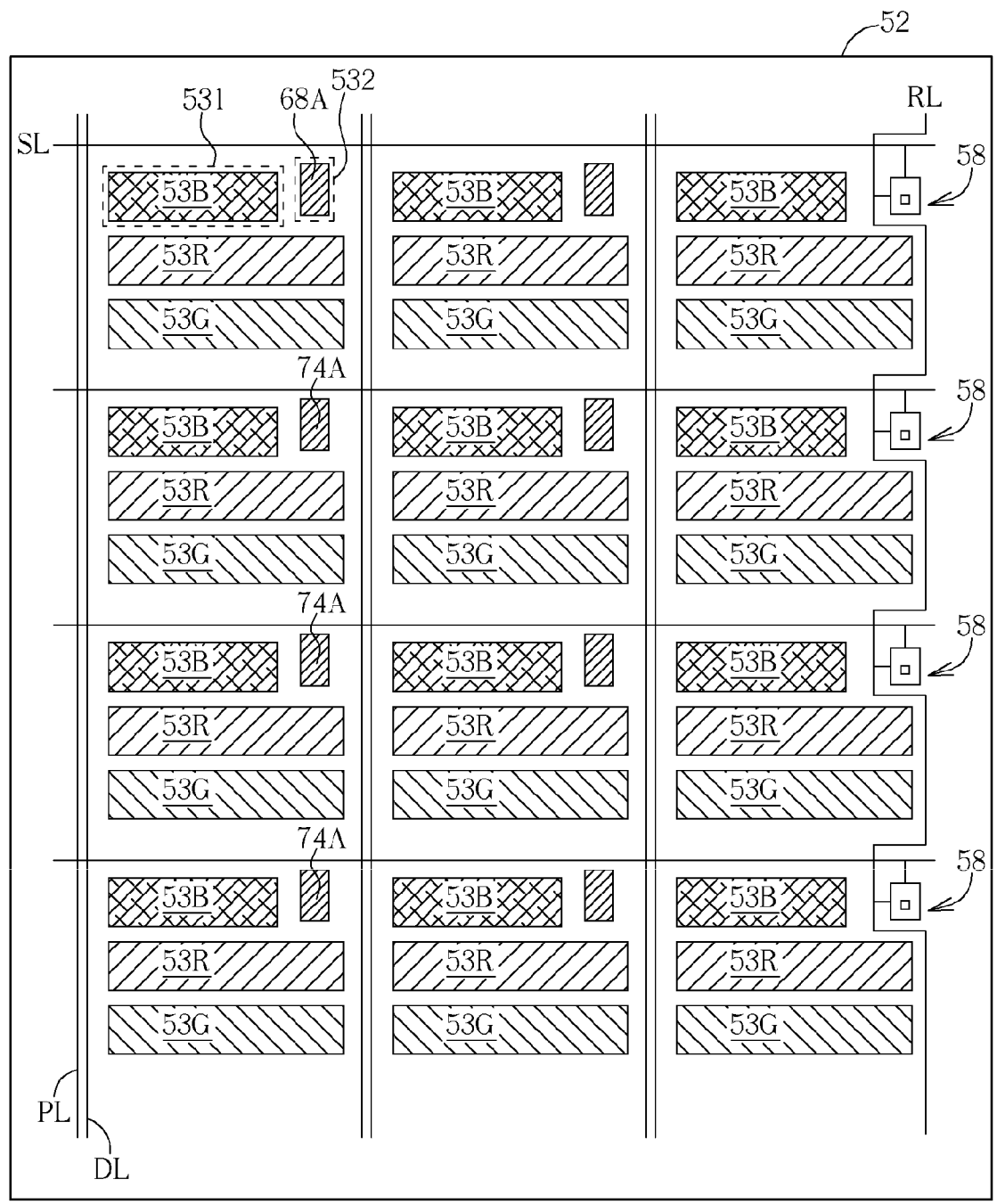
FIG. 4 is a schematic diagram showing another preferred embodiment of an electroluminescent display touch panel in the present invention.

The electroluminescent display touch panel in the abovementioned embodiment is stripe type, but the application of the present invention is not limited and can be other types. FIG. 4 is a schematic diagram of another preferred embodiment of the electroluminescent display touch panel in the present invention. As illustrated in FIG. 4, the pixel arrangement of the electroluminescent display touch panel in the present embodiment is tri-gate type, which is different from the above embodiment. In this embodiment, three sub-pixel regions are connected with the same data line DL in common, and such design can save power consumption of the data line and the overall power consumption. The arrangement of other main devices such as the pixel switching device 55, the readout device 56, the sensing pad 58, the electroluminescent device 60, the power source line PL and the readout line RL, the first spacer 68, the sensing spacer 70 and the second spacer 74 is somewhat modified accordingly, but the function of each device is the same as in a stripe type electroluminescent display touch panel, and is not redundantly described in details.

In summary, the electroluminescent display touch panel in the present invention integrates the touch input devices into the inside of the electroluminescent display touch panel and accordingly decreases the thickness of the electroluminescent display touch panel obviously.

Besides, the electroluminescent display touch panel in the present invention is a top-emitting type, and the aperture ratio can be therefore improved. Moreover, the electroluminescent display touch panel in the present invention can support both single-touch input and multiple-touch input function, and can be applied to the electroluminescent display touch panels in a variety of sizes.

Those skilled in the art will readily observe that numerous modifications and alterations of the device and method may be made while retaining the teachings of the invention.

What is claimed is:

1. An electroluminescent display touch panel comprising:
a base substrate comprising:
a plurality of scan lines disposed on the base substrate;
a plurality of data lines disposed on the base substrate, and intersecting the scan lines to define a plurality of pixel regions, wherein each of the pixel regions includes a display region and a non-display region, and the non-display regions include at least a first group, a second group and a third group;
a plurality of pixel switching devices disposed correspondingly in the display regions of the base substrate;
a plurality of electroluminescent devices disposed correspondingly in the display regions, each of the electroluminescent devices comprising a first electrode, a second electrode and an illumination element disposed between the first electrode and the second electrode, wherein the first electrode is electrically connected with the pixel switching device;
a plurality of readout devices disposed in the first group of the non-display regions of the base substrate;
a plurality of sensing pads disposed in the first group of the non-display regions of the base substrate and electrically connected with the readout devices correspondingly;
a plurality of first spacer pads disposed in the second group of the non-display regions of the base substrate;
a plurality of second spacer pads disposed in the third group of the non-display regions of the base substrate, wherein the first group, the second group and the third group of the non-display regions are different; and
an encapsulating substrate disposed opposite to the base substrate, the encapsulating substrate comprising:
a plurality of first spacers disposed on a surface of the encapsulating substrate facing the first spacer pads in the second group of the non-display regions of the base substrate correspondingly, and contacting the first spacer pads correspondingly for maintaining a cell gap between the base substrate and the encapsulating substrate;
a plurality of second spacers disposed on the surface of the encapsulating substrate facing the second spacer pads in the third group of the non-display regions of the base substrate correspondingly, and each of the second spacer is substantially not in contact with the second spacer pad, correspondingly;
a plurality of sensing spacers disposed on the surface of the encapsulating substrate facing the sensing pad in the first group of the non-display regions of the base substrate correspondingly; and
a conductive layer disposed on a surface of the sensing spacers facing the sensing pads.

2. The electroluminescent display touch panel of claim 1, further comprising a plurality of power source lines electrically connected to the second electrodes correspondingly.

3. The electroluminescent display touch panel of claim 1, wherein the electroluminescent device comprises an organic light-emitting diode (OLED) device.

4. The electroluminescent display touch panel of claim 3, wherein the organic light-emitting device comprises an electron-transporting layer, an organic light-emitting layer and a hole-transporting layer.

5. The electroluminescent display touch panel of claim 1, wherein the conductive layer covers a surface of the encapsulating substrate facing the base substrate.

6. The electroluminescent display touch panel of claim 1, wherein the conductive layer covers a sidewall of the sensing spacer.

7. The electroluminescent display touch panel of claim 1, wherein the first spacer has substantially the same height with the sensing spacer.

8. The electroluminescent display touch panel of claim 7, wherein the first spacer pad of the base substrate has a first thickness corresponding to the first spacer.

9. The electroluminescent display touch panel of claim 8, wherein the second spacer pad has a second spacer pad with a second thickness corresponding to the second spacer.

10. The electroluminescent display touch panel of claim 9, wherein the sensing pad of the base substrate has a third thickness corresponding to the sensing spacer.

11. The electroluminescent display touch panel of claim 10, wherein the first thickness is thicker than the second thickness and third thickness.

12. The electroluminescent display touch panel of claim 1, wherein a material of the sensing spacer comprises elastic materials.

13. The electroluminescent display touch panel of claim 1, further comprising a sealant connected between the base substrate and the encapsulating substrate.

14. The electroluminescent display touch panel of claim 1, wherein the conductive layer is electrically connected with a common voltage.

15. An electroluminescent display touch panel comprising:
   a first substrate comprising:
      a plurality of scan lines disposed on the first substrate;
      a plurality of data lines disposed on the first substrate, and intersecting the scan lines to define a plurality of pixel regions, wherein each of the pixel regions includes a display region and a non-display region, and the non-display regions include at least a first group, a second group and a third group;
      a plurality of electroluminescent devices disposed correspondingly in the display regions, wherein the electroluminescent device is electrically connected with one of the scan lines and one of the data lines correspondingly;
      a plurality of readout devices disposed on the first substrate;
      a plurality of sensing pads disposed in the first group of the non-display regions of the first substrate and electrically connected with the readout devices correspondingly;
      a plurality of first spacer pads disposed in the second group of the non-display regions of the first substrate;
      a plurality of second spacer pads disposed in a third group of the non-display regions of the first substrate, wherein the first group, the second group and the third group of the non-display regions are different; and
   a second substrate disposed opposite to the first substrate, the second substrate comprising:
      a plurality of first spacers disposed on a surface of the second substrate facing the first spacer pads in the second group of the non-display regions of the first substrate correspondingly, and contacting the first spacer pads correspondingly for maintaining a cell gap between the first substrate and the second substrate;
      a plurality of second spacers disposed on the surface of the second substrate facing the second spacer pads in the third group of the non-display regions of the first substrate correspondingly, and each of the second spacer is substantially not in contact with the second spacer pad, correspondingly;
      a plurality of sensing spacers disposed on the surface of the second substrate facing the sensing pad in the first group of the non-display regions of the first substrate correspondingly; and
      a conductive layer disposed on a surface of the sensing spacers facing the sensing pads.

16. The electroluminescent display touch panel of claim 1, wherein each of the readout devices comprising a gate electrode, a source electrode and a drain electrode, wherein each of the source electrodes is electrically connected with the sensing pad correspondingly.

17. The electroluminescent display touch panel of claim 15, wherein each of the readout devices comprising a gate electrode, a source electrode and a drain electrode, wherein each of the source electrodes is electrically connected with the sensing pad correspondingly.

* * * * *